United States Patent Office 2,721,626
Patented Oct. 25, 1955

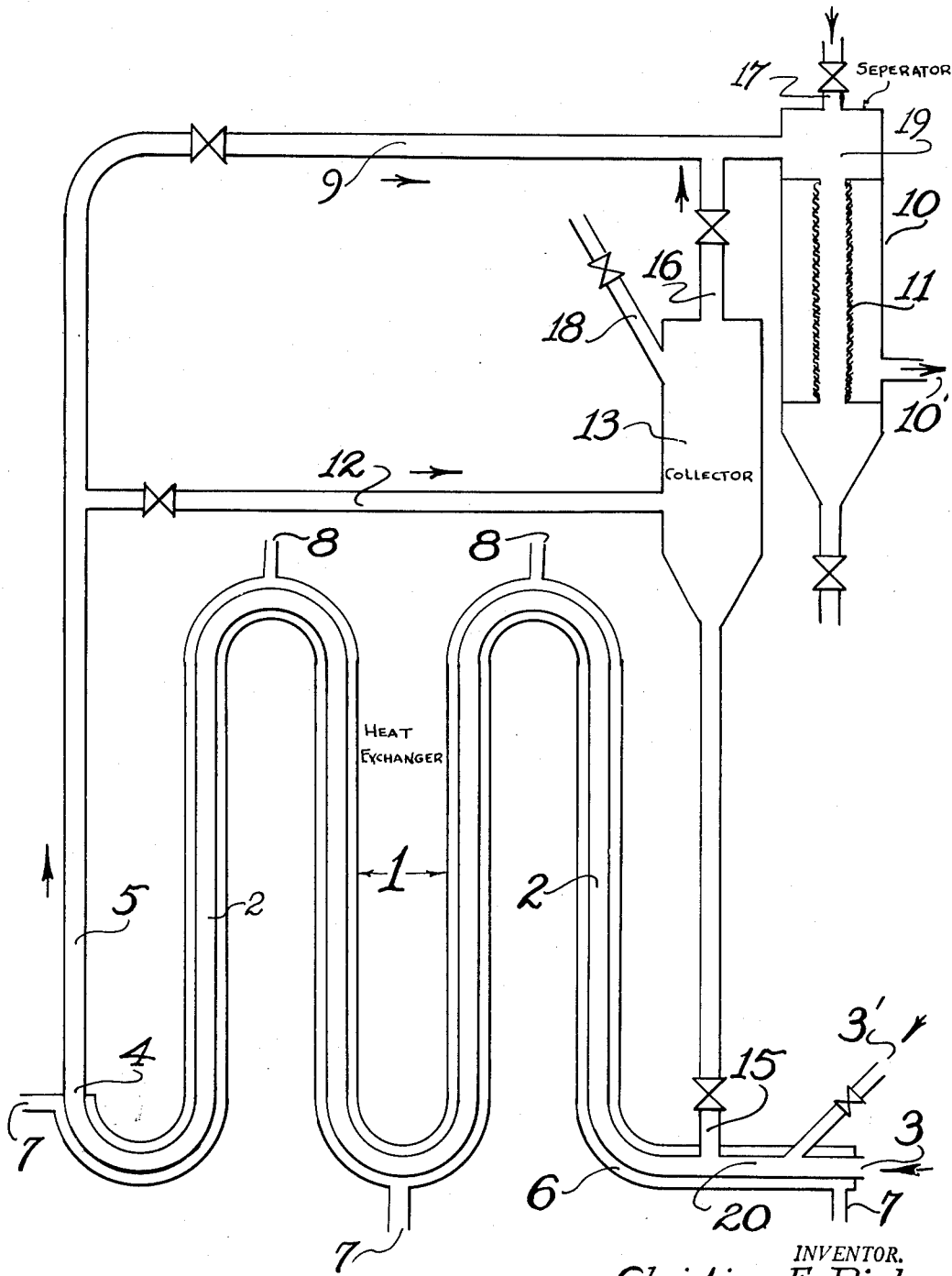

2,721,626

COOLING AND SEPARATING BY CONDENSATION OF HOT GASEOUS SUSPENSIONS

Christian E. Rick, Wilmington, Del., assignor to E. I. du Pont de Nemours and Company, Wilmington, Del., a corporation of Delaware Application December 15, 1951, Serial No. 261,903

6 Claims. (Cl. 183—119)

This invention relates to the cooling of hot gaseous mixtures containing suspended solids, and more particularly to the quick quenching of highly heated reaction product suspensions containing titanium dioxide.

It is necessary in many industrial operations that hot gaseous mixtures be rapidly cooled from a relatively high, reactive temperature to a relatively low, non-reactive condition. Thus, in producing pigmentary $TiO_2$ under, for instance, the disclosures of U. S. Patent 2,488,439 by oxidizing titanium tetrachloride in the vapor phase at from about 850–1350° C. with an oxygen-containing gas, such as air, the hot (above 1000° C.) gaseous suspension of $TiO_2$, liberated chlorine, oxygen, nitrogen, etc., must be quickly cooled to below 600° C. so that undesired $TiO_2$ particle size growth and loss of pigment tinting strength, hiding power, etc., will be prevented. In producing an optimum form of pigment, the cooling must be accomplished within from 1–30 seconds following discharge of the suspension from the reactor.

The relatively high temperature of and presence of corrosive chlorine in these suspensions renders their quick cooling or quenching very difficult and costly. Furthermore, resort must be had to a cyclic type of operation from which recovery can be effected of sufficiently concentrated chlorine by-product gases to permit of their reuse in chlorinating a titaniferous material such as ilmenite to provide additional quantities of titanium tetrachloride reactant for the oxidation step.

Although gaseous suspensions can be cooled in several ways, resort to quenching by directly mixing large quantities of cold air with the hot suspension is not feasible because the by-product gases become diluted to such an extent as to render them unfit for reuse in chlorinating a titaniferous material. While the gases can be concentrated by purifying treatments which remove undesired diluents, this is impractical due to the great expense entailed in required additional plant equipment and the difficulties, particularly corrosion problems, which the rehandling of such hot corrosive chlorine-containing gases present. If resort is had to indirect heat exchange, wherein the suspension is cooled by passing a relatively cold fluid externally over the heat exchange surface, an objectionably thick, adhering deposit of $TiO_2$ forms upon the internal surfaces of the heat exchange apparatus and particularly where the hot material comes in contact with the cold heat transfer surface. This deposit, in many instances, is accentuated by the tendency of the solid to become slightly plastic when hot. This deposition builds up on the interior surfaces of the cooler, and if, as in the instance of $TiO_2$ pigment, the deposit is a relatively poor heat conductor, the surfaces are eventually insulated to greatly reduce their heat transfer function and render the overall efficiency of the heat exchange apparatus inadequate. Furthermore, should the deposition continue without interrupting the operation to effect apparatus cleanout, eventual stoppage of the apparatus through plugging may take place.

It is among the objects of this invention to overcome the above and other disadvantages characterizing prior types of cooling operations and to provide novel and effective methods and means for attaining these objects. It is among the particular objects of the invention to provide a novel method for quickly cooling or quenching vaporous mixtures containing suspended solids and particularly hot $TiO_2$-containing gaseous suspensions resulting from the vapor phase oxidation of titanium tetrachloride. Further objects include the provision of a novel type of cooling operation from which by-product chlorine-containing gases can be readily recovered and in sufficiently concentrated form as to enable them to be directly employed in chlorinating a titaniferous material in the preparation of titanium tetrachloride; the cooling of a gaseous suspension under such conditions as will afford and insure the maintenance of optimum heat transfer efficiency in the apparatus being employed in the cooling operation; the minimization or prevention altogether of objectionable build-up of solid $TiO_2$ material on the surfaces of the conduit or chamber utilized in the cooling operation; the cooling of large volumes of gases in equipment of relatively simple and inexpensive construction; and the effecting of the quick cooling of a $TiO_2$ pigment by means which will not injure but which will enhance the desired properties of such pigment. Other objects and advantages will be apparent from the ensuing description and accompanying diagrammatic drawings which illustrate one form of useful apparatus in which the invention can be carried out.

These objects are attained in this invention which comprises cooling a hot, gaseous, solids-containing suspension by flowing said suspension continuously through a relatively restricted, externally cooled conduit, while directly commingled with solid particles larger in size than those present in suspension and resistant to the thermal and chemical environment of the mixture, and throughout the cooling operation maintaining a gaseous flow rate of said mixture sufficient to effect its transport through said conduit and impart an abrading action upon and removal of solid material deposited on or adhering to the internal walls of the cooling conduit.

In a more specific and preferred embodiment the invention comprises quickly cooling to below 600° C. a hot, reactive $TiO_2$ pigment containing gaseous suspension obtained from the vapor phase oxidation at temperatures ranging from 850–1350° C. of titanium tetrachloride by continuously charging said gaseous suspension directly from the oxidation reactor into an elongated, relatively restricted cooling conduit for passage through the latter in indirect heat exchange relationship with a cooling medium being simultaneously flowed about the exterior surface of said conduit, prior to introduction of the charge into the cooling conduit directly commingling therewith cold, solid $TiO_2$ particles or aggregates which are larger in size than the pigmentary $TiO_2$ present in the reaction suspension, and maintaining the commingled mass under such a flow rate through the conduit that the pigmentary and added $TiO_2$ solids present therein remain in suspension and the added solids abrasively scour the internal walls of the conduit and prevent $TiO_2$ deposition and accumulation thereon.

In the accompanying drawing there is illustrated one adaptation of the invention in which, for example, a hot (900–1300° C.) reactive suspension of pigmentary $TiO_2$ can be quenched quickly (within 1–10 seconds) to below 600° C. while preventing oxide scale build-up upon the internal walls of the apparatus by adding to the suspension regulated quantities of suitable, larger abrading particles. Thus, the suspension can comprise the reaction products from the vapor phase oxidation of titanium tetrachloride with oxygen or an oxygen-containing gas, such as air enriched with small amounts of H₂O, ranging from say .05% to 10% by volume based on the total volume of gases reacted and in accordance with the methods of U. S. Patent 2,488,439. Following the quenching, the larger abrading particles are first removed by settling chamber, cyclone or other form of treatment and recycled for reuse in the system. Thereafter, recovery of the finer $TiO_2$ particles is effected by treatment of the cooled suspension in suitable recovery apparatus, such as cyclones, precipitators, filters or the like.

Referring to the drawing, there is shown a conventional heat exchange apparatus 1 provided with an elongated, relatively restricted aluminum or other form of tubular metal conduit or coil 2 having an inlet 3 and a discharge outlet 4, which leads into a valved conduit 5. The coil inlet 3 can be directly associated, if desired, with the discharge outlet (not shown) of an oxidation reactor (also not shown), and a suitable jacketing element 6 is arranged about said coil to effect cooling thereof by passing water or other form of cooling fluid continuously thereover following the introduction of such fluid into the jacketing element through inlets 7 for flow over the exterior surfaces of the coil and ultimate discharge from the jacket through outlets 8. The conduit 5 communicates, via a line 9, with a vacuum type solids separator or filter chamber containing a filter bag 11, said chamber having a venting conduit 10' through which filtered gas from the system can be withdrawn and a vacuum maintained in chamber 10 through the medium of an associated steam injector or other means (not shown). The conduit 5 also communicates, via the valved line 12, with a storage bin or collector 13 adapted to be employed as a separator for settling out scrubbing solids from the cooled gaseous suspension and for storing them for recycling, via the valved conduit 15, back to the inlet 3 of coil 2. A valve-controlled line 16 is provided in the top or upper portion of bin 13 through which finer particles separated from the coarser material in the collector 13 can be fed to line 9 and collector 10 for recovery in the latter. A valved line 17 is positioned at the junction of conduit 9 and collector 10 for purposes of admitting air to the system as desired so as to maintain therein the desired pressure, usually about atmospheric. A valve-controlled inlet means 18 is disposed in the bin or hopper 13 through which abrading solids from an extraneous source can be added to said hopper for storage therein and use in the system.

In adapting the invention in an apparatus such as that described, cold water or other suitable cooling medium can be continuously charged through the jacketing means 6 for flow over the coil 2 to effect external cooling of said coil. The hot $TiO_2$ suspension in then fed directly and continuously from a reactor or other source of supply into coil inlet 3 with regulated amounts of cold, solid, unitary or aggregated abrading particles, such as pure silica sand grains or agglomerated $TiO_2$ particles larger in size than the suspended $TiO_2$ particles present in the reaction products being treated, being periodically or continuously fed into the suspension from the hopper 13 through the conduit 15 and as said suspension passes to the coil 2 through inlet 3. The amount of scrubbing solids so introduced will depend upon the amount of attrition or surface scouring which is desired rather than the amount of heat which is to be absorbed by the solids. Such amount is usually relatively small and ranges from about 1–20% by weight, and preferably from 5–15%, of the amount of $TiO_2$ present in the suspension being charged to the cooling coil. The resulting mixture is flowed at sufficient velocity through the coil 2 that the pigmentary and added solids will be maintained in suspension therein and said added solids will abrasively attack and remove any $TiO_2$ deposit which may tend to adhere to the internal surfaces of the coil 2. For such purposes, resort is had to a velocity of about 40 feet per second with a general velocity range being from about 10–75 feet per second. Upon emergence of the cooled suspension (at a temperature below 600° C.) from the coil 2, it can be passed directly, via the conduit 9, to the filtering chamber 10 wherein the pigmentary $TiO_2$ can be filtered from the cooled gas stream by filter bag 11. Alternatively the cooled charge can be fed from the line 5 through the line 12 to the separator 13 wherein the scrubbing solids can be allowed to settle out from the cooled gaseous suspension and the finer $TiO_2$ pigment suspension recovered in said separator can be passed therefrom through the line 16 communicating with the conduit 5 to the filtering chamber 10 wherein recovery can be effected.

To a clearer understanding of the invention, the following specific examples are given none of which are to be construed as being in limitation of the underlying principles of my invention.

EXAMPLE I

The products of reaction, consisting of suspended $TiO_2$, chlorine, oxygen and nitrogen, at a temperature of 1150° C., obtained from the vapor phase oxidation of $TiCl_4$ with air at a rate equivalent to 1320 pounds of $TiO_2$ per hour were charged from a reactor continuously into the inlet of a water-cooled aluminum coil in an apparatus of the type shown in the drawing. Simultaneously, 1000 pounds per hour of pure, cold silica sand of +10 to −20 mesh was charged to said coil from the bin 13 and the line 15, while 1000 pounds per hour of air was concurrently added through the valved air inlet line 3'. The product-sand mixture was then conveyed through the coil 2 and aluminum conduit 5. With the valve in line 12 in open position and the valve in line 9 in closed position, the cooled products issuing from the coil 5 entered the bin 13 where the sand separated from the pigment-gas products. The sand was recirculated again through the valved line 15 while the product stream issued from the separator 13 through the valved line 16 at about 250° C. and was cooled to below 130° C. by air introduced through the valved line 17 prior to passage to the bag filters 11. It was observed that good heat transfer was maintained in the cooler and that the sand effectively prevented the deposit of an insulating layer of pigment on the cooling surfaces. Cessation of sand flow for more than a few minutes resulted in a continuous exit temperature rise above 250° C. at the bin 13 so that operation could not continue without damage to the nonwater cooled bin and valves.

EXAMPLE II

A $TiO_2$ suspension, at a temperature of 1200° C., similar to that of Example I and comprising the reaction products from the oxidation of $TiCl_4$ with air but in which a small percentage of $TiO_2$ scale had been incorporated by reason of the periodic removal of such scale from the internal walls of the reactor by means of a mechanical scraper, was charged on its issuance from said reactor to a water-cooled aluminum coil in an apparatus of the type shown in the accompanying drawing. Immediately upon its introduction into the coil, the products were quenched to about 900° C. by means of the introduction through line 3' of 6000 pounds per hour of cooled, filtered product gases from the system. Upon discharge of the cooled products from the cooling coil, they were passed to the separator 13 and thence through the valved line 16 to the collector 10. The temperature of the products at the point 19 increased slowly from the start of the operation and to a temperature ranging from 250–300° C. Cooled, filtered product gas was introduced into the system through valved line 17, which maintained the temperature of the stream going to the filters below 1150° C. Immediately after each operation of the scraping element within the reactor, the temperature of the products under treatment dropped 25–50° C. at the point 19, thereby indicating that the coarse particles removed from the reactor to be present in the product stream had eliminated any pigment coating from the interior of the water-cooled conduit. This cycle of operation was carried out for 10½ hours without incurring any loss of cooling efficiency.

EXAMPLE III

TiCl₄ and AlCl₃ vapors were mixed in proportion to yield 99 parts TiO₂ with 1 part Al₂O₃ and heated to 895° C. at a rate equivalent to 2500 pounds per hour TiO₂. Air containing 1% water vapor by volume was heated to 1060 C. and mixed quickly with the chloride vapor under 9 pounds p. s. i. gauge in an oxidation reactor provided with a scraper for removing oxide scale deposit from its internal walls. The products of reaction were continuously fed from the reactor outlet into a 1500 foot length of water-cooled aluminum pipe, the first third of which was 12 inches in diameter and its remaining portion 10 inches in diameter, and then into a collection apparatus of the type shown in the drawing. 1100 pounds per hour of cool, recycled gas, obtained by filtering the TiO₂ from a cooled product stream from the system were simultaneously introduced to the system through the conduit 3' to partially cool the products of reaction at the point or section 20. The combined stream passed through the water-cooled coil. With the valves in lines 12 and 16 in closed position and the valve in line 9 open, the product stream went directly to bag filter 11. At 2½ minute intervals, 10 pounds of calcined TiO₂ pigment, in the form of minus ¼ inch aggregate were added to the reaction products through line 15. The reactor scraper was operated at 15 minute intervals, and immediately following each operation a marked temperature drop was noted all along the length of the cooler. Although the temperatures increased slightly between reactor scrapings, the average temperature at point 19 failed to increase due to the arrangement described in which the coarse aggregate and the large crystals of TiO₂ formed on the reactor walls (to the extent of about 4% of the production) periodically removed accumulated fine pigment from the walls of the cooler.

The severe penalty in heat transfer decrease which results when cooling surfaces become coated or fouled with a layer of TiO₂ pigment is shown by the data in the following table, which was obtained by measuring the amount of heat transferred against time of exposure of a heat transfer surface to the pigment-laden hot product gas.

Table I

| Elapsed Time, Minutes | Overall Coefficient, B. t. u./ft.², hr./° F. | Thickness of Pigment Deposit |
| --- | --- | --- |
| 0 |  | 0 clean. |
| 1 | 9.5 |  |
| 2 | 7.8 |  |
| 3 | 6.9 |  |
| 4 | 5.5 |  |
| 5 | 5.0 |  |
| 10 | 4.0 |  |
| 15 | 3.5 |  |
| 20 | 3.0 |  |
| 25 | 2.2 | ¼" fouled. |

The effectiveness of using scrubbing solids in accordance with this invention to remove the insulating deposit and improve the heat transfer in a cooler of the type shown in the drawing, and which has associated therewith a reactor provided with mechanical scraping means for removing scale from its internal walls, is illustrated by the data shown in the following table.

Table II

| Elapsed Time, Min. | Gas Temperatures | | | Scrubbing Solids | | Reactor Scraped |
| --- | --- | --- | --- | --- | --- | --- |
|  | End 1st Section | End 3d Section | At Filter Chamber | In Reactor Outlet | In 12th Leg |  |
| 0 | 610 | 410 | 110 | X |  |  |
| .75 | 605 | 400 | 110 |  |  |  |
| 1.5 | 590 | 375 | 108 |  |  | X |
| 2.25 | 570 | 350 | 106 |  |  |  |
| 3.0 | 570 | 340 | 103 |  |  |  |
| 3.75 | 570 | 340 | 101 |  |  |  |
| 4.5 | 570 | 350 | 100 |  |  |  |
| 5.25 | 575 | 360 | 100 | X |  |  |
| 6.0 | 575 | 370 | 100 |  |  |  |
| 6.75 | 560 | 345 | 102 |  |  |  |
| 7.5 | 560 | 335 | 100 |  |  |  |
| 8.25 | 565 | 345 | 100 |  |  |  |
| 9.0 | 570 | 360 | 100 |  |  |  |
| 9.75 |  |  | 101 |  |  |  |
| 10.5 | 590 | 390 | 103 | X |  |  |
| 11.25 | 575 | 370 | 105 |  |  |  |
| 12.0 | 570 | 350 | 105 |  |  |  |
| 12.75 | 570 | 355 | 105 |  |  |  |
| 13.5 | 580 | 370 | 105 |  |  |  |
| 14.25 | 585 | 380 | 105 |  |  |  |
| 15.0 | 590 | 400 | 107 |  |  |  |
| 15.75 | 590 | 400 | 109 |  |  | X |
| 16.5 | 580 | 380 | 112 | X |  |  |
| 17.25 | 560 | 345 | 110 |  |  |  |
| 18.0 | 560 | 335 | 105 |  |  |  |
| 18.75 | 565 | 340 | 100 |  | X |  |
| 19.5 | 570 | 360 | 97 |  |  |  |
| 20.25 | 580 | 375 | 96 |  |  |  |
| 21.0 |  |  |  |  |  |  |

The gas temperatures were obtained on a cycling recorder at 45 second intervals. Scrubbing solids were added at the reactor outlet every 5 minutes in an amount equivalent to about 7.5 pounds calcined TiO₂ particles per 100 pounds of suspended product TiO₂. Additional solids were injected into the 12th leg of the cooler at required intervals. The reactor was scraped every 15 minutes. The data in Table II show:

(1) An immediate drop in temperature of the gas leaving the first section of the cooler after the addition of the solids to the reactor outlet, then a leveling off and an increase whereupon the next addition again gives beneficial results.

(2) The scraping of the reactor also gives additional benefits as shown by the effect on the gas temperature at the filter chamber after each scraping.

(3) The addition of solids at the 12th section also results in additional cleaning as shown by filter chamber gas temperatures (18 min. and after).

By my invention, this simple economic method of cooling is made feasible for uses in which previously it was most unsuited.

As already noted, the solid scrubbing agent can be added either periodically or continuously to the TiO₂ suspension under treatment. The amount used is variable and will depend upon the particular needs desired. In general, the addition of an amount of scrubbing solids ranging from about 1 to 20% of the TiO₂ under production will be found adequate to effect desired removal of accumulated pigment deposit and allow a relatively high, uniform rate of heat removal from the product stream. The solids may be added at any convenient point in the system (for instance, to the air stream), but are generally most conveniently added to the product stream as it discharges from the reactor or at any convenient point along the cooling conduit. Obviously, the solids may be added at a multiple of addition points and especially at those points adjacent which a relatively severe build-up occurs due to the configuration of the apparatus, such as at return or other forms of bends employed in the system, and where severe impact of the suspended TiO₂ is experienced by the wall surfaces.

In such zones, the provision of one or more gas inlet jets positioned to minimize direct impact of the streaming particles upon the surface can be resorted to. This is effective because although the high velocity jet is limited to only a portion of the area, it breaks up the streamline flow closely adjacent to the coating and provides an avalanching effect to remove the coating in other areas not directly reached by the jet blast. The gas used for this purpose is preferably unreactive towards the gaseous and solid components of the oxidation reaction. The chlorine containing oxidation product gases which previously have been cooled and freed of their TiO₂ serves the purpose most admirably. Other utilizable gases include chlorine, air, carbon dioxide, inert gases, etc.

As already noted, the abrading solid particles employable herein individually may be unitary or aggregated. They should be larger in size than the suspended solid particles, and generally can range in size from ¼ inch to 100 mesh. Pure silica sand grains of the indicated size are illustrative of the unitary type, whereas a collection of a number of very small particles bound together to form a mass of the desired size, such as calcined agglomerated TiO₂ particles, is an example of the aggregate type. One particularly useful form of TiO₂ scrubbing solid comprises a calcined material possessing the following characteristics.

| Screen fractions | Percent by wt. | Bulking density g./100 cc. |
| --- | --- | --- |
| +4 | 3.5 | 40 |
| −4+8 | 5.3 | 48 |
| −8+16 | 10.0 | 52 |
| −16+30 | 16.0 | 56 |
| −30+70 | 40.3 | 62 |
| −70 | 24.9 | 62 |
| Total sample | 100.0 | 64 |

The selection of a solid which will not contaminate the pigment is preferable since thereby one eliminates the necessity of resorting to a separatory operation to remove such solid from the pigment product. Solids so employable can be obtained in several ways and from various steps in the vapor phase process. Thus the filtered TiO₂ pigment is normally calcined at 600–800° C. to remove residual chlorine. This calcined material serves as an excellent abrading or scrubbing agent. To increase its hardness and to provide more effective conduit wall cleaning, the pigment can be calcined at 800–1000° C. or higher, or until some particle growth or sintering occurs. The use of harder particles generally results in a more efficient abrasion or scrubbing action and therefore lessens the amount of solids necessary to obtain a satisfactory operation. The calcined pigments can be screened or otherwise classified to obtain a larger percentage of hard particles and reduce the amount of recycled product. A further increase in particle hardness can be obtained by wetting the pigment with water prior to the calcination, which insures a desired compacting of the particles during the heating. Alternatively, the scrubbing solids can comprise, as already noted, the hard scale deposit formed upon and periodically removed from the internal walls of the reactor through the medium of mechanical scraping or spalling.

Non-pigment type of abrading materials, particularly finely divided ceramic type substances, such as pure sand, alumina, mullite, etc., can also be used provided they are thermally and chemically resistant to the hot gases. These materials also should be free of undesired impurities, especially substances containing elements which produce colored compounds such as iron, manganese, vanadium, chromium, etc., and which might be leached by the corrosive gases and subsequently induce discoloration of the white TiO₂ pigment.

In the application of the invention certain considerations are to be observed in the selection of the cooling conduit. The cooling area necessary for removal of the required amount of heat must be supplied and in doing this a slight film of solid deposit on the walls is taken into account. In general, sharp right angle bends or configurations which involve spaces where solids can collect are to be avoided. The conduit is selected to be of such internal cross-sectional area that the linear velocity of the gaseous suspension does not go below that which will convey the scrubbing solids through the conduit. Additionally, the conduit size may be decreased in cross-sectional area in the sections near the outlet thereby at least partially compensating for the decrease in gas volume which occurs as the gases become progressively cooler. In applying the invention, using a scrubbing material as shown in Table II, the velocity at the outlet of the conduit was not allowed to drop below 40 feet per second. In general, the higher velocities do more efficient scrubbing if the impacts with the wall deposit do not break up drastically the solid structure of the scrubbing material.

A cooler designed for operation at a certain product gas throughput may be operated at lower pigment production rates by recycling a portion of the cooled product gas. This can be done by withdrawing some of the cooled product gas after separation from its suspended pigment load, compressing it and injecting it into the cooler at suitable points. This method makes it possible to achieve the necessary conveying velocities and also allows the injection of solids or the use of high velocity jets of gas at other points in the cooling system, i. e. prior to bends near the exit end of the cooler.

The choice of metal used in constructing a cooler suitable for use herein will depend upon the particular needs, the product quality, and economic considerations. Two metals (aluminum and nickel) were used in a cooler constructed in accordance with a preferred application, but obviously other forms of metal or alloys, and especially those having corrosion resistance and high heat conductivity characteristics can be utilized. In regions where corrosion and abrasion were most severe (section at reactor outlet and the U-bends) nickel was used while the remainder of the cooling conduit was constructed of aluminum.

The cooling of the exterior surface of the conduit can be effected by any well known means, as by flowing the coolant through a jacket, spraying, flowing over the coil exterior, etc. It will suffice to take the usual precautions of insuring that the coolant fluid contact the exterior surfaces of the coil and in such manner that no area is allowed to become overheated and that the various known factors which yield good transfer of heat are obtained.

The many advantages of the invention will be apparent from the foregoing description. In general, it affords a novel means for effecting cooling of hot suspensions of solids in corrosive, chlorine-containing gases by a rapid and efficient heat-exchange technique; minimization of the deleterious effect which build-up of the cooled solids on the surfaces would otherwise incur; and the use of a very simple and economical apparatus construction. The solid particles are incorporated in the TiO₂ suspension primarily as a cold, scouring agent; such particles are not cooled by external cooling apparatus; and the amount of solids used depends upon and is regulated by the amount of attritive effect desired—not by the heat which is to be absorbed by the solid. The added solids are cold when they enter the system and are cold when they leave the cooler: Thus a less complex, more efficient and economical cooling system is provided over previous methods, with less power being needed to effect movement of the solids added and under treatment in the system.

I claim as my invention:

1. A process for quenching a hot, gaseous oxide solids-containing reaction suspension while preventing oxide scale accumulation on the internal walls of the quenching apparatus, which comprises charging said suspension continuously from a reactor through a restricted, externally cooled conduit in admixture with a scouring amount of cooler, added finely divided inert attritive solid particles larger in size than the solids present in said suspension and in the size range of from ¼″ to 100 mesh, and throughout the passage of the mixture through said conduit maintaining said mixture under a rate of flow adapted to transport the solid particles in suspension and impart an abrading action by said larger particles upon solid deposits formed upon the internal walls of said conduit, and separating and recovering the solids originally present in the reaction suspension from the quenched material discharged from said cooling conduit.

2. A process for quenching a hot, gaseous $TiO_2$ pigment-containing reaction suspension while preventing oxide scale build-up upon the internal walls of the quenching apparatus, which comprises charging said suspension from a reactor continuously through a restricted, externally cooled conduit while admixed with a scouring amount of cooler, added finely divided inert attritive solid particles larger in size than the $TiO_2$ particles present in said suspension and in the size range of from 1/4" to 100 mesh, throughout the passage of the resulting mixture through said conduit maintaining said mixture under a flow rate adequate to transport its solids content in suspension and impart an abrading action by said larger particles upon solid oxide deposits formed upon the internal walls of said cooling conduit, and thereafter separating and recovering said titanium oxide particles from the cooled suspension.

3. A process for quenching a hot, gaseous $TiO_2$ pigment-containing reaction suspension while preventing oxide scale build-up upon the internal walls of the quenching apparatus, comprising continuously charging said suspension upon its exit from a reactor through a restricted, externally cooled conduit in admixture with a scouring amount of cooler, added finely divided inert attritive solid particles larger in size than the $TiO_2$ particles present in said suspension and in the size range of from 1/4" to 100 mesh, and throughout the passage of the mixture through said conduit maintaining thereon a flow rate from about 10–75 feet per second, and thereafter separating and recovering said $TiO_2$ pigment product from the quenched products discharged from said cooling conduit.

4. A process for quenching a hot, gaseous $TiO_2$ pigment-containing reaction suspension while preventing oxide scale build-up upon the internal walls of the quenching device, comprising charging said suspension from a reactor continuously through a restricted, externally cooled conduit while admixed with from 1–20% by weight of cold, added finely divided inert attritive solid $TiO_2$ particles larger in size than the $TiO_2$ particles present in said suspension and in the size range of from 1/4" to 100 mesh, throughout the passage of the mixture through said conduit maintaining a flow rate thereon ranging from about 10–75 feet per second, and thereafter separating and recovering the $TiO_2$ pigment from the cooled suspension obtained from said cooling conduit.

5. A process for quenching a gaseous $TiO_2$ pigment-containing reaction suspension from a temperature ranging from 900–1300° C. to below 600° C. while preventing oxide scale build-up upon the internal walls of the quenching apparatus, which comprises charging said suspension from a reactor for continuous passage through a restricted, externally cooled conduit, admixing therewith from 5–15% by weight based on the amount of $TiO_2$ present in the suspension of cold, finely divided inert attritive $TiO_2$ particles larger in size than the $TiO_2$ particles present in said suspension and in the size range of from 1/4" to 100 mesh, throughout the passage of the mixture through said conduit maintaining it under a velocity of from 10–75 feet per second, and thereafter separating and recovering the $TiO_2$ pigment from the resulting cooled suspension.

6. A process for quenching a gaseous $TiO_2$ pigment-containing reaction suspension from a temperature ranging from 900–1300° C. to below 600° C. while preventing oxide scale build-up upon the internal walls of the quenching apparatus, comprising charging said suspension upon its exit from a reactor continuously through a restricted, externally cooled conduit, adding to said suspension prior to its introduction into said conduit from 5–15% by weight, based on the $TiO_2$ present in the suspension, of solid abrading particles resistant to the thermal and chemical environment of said suspension and larger in size than the $TiO_2$ pigment present therein and in the size range of from 1/4" to 100 mesh, maintaining the resulting mixture under a flow rate through said conduit of about 40 feet per second, and thereafter separating and recovering the pigmentary titanium dioxide from the cooled suspension discharged from said conduit.

References Cited in the file of this patent

UNITED STATES PATENTS

| | | |
|---|---|---|
| 1,916,337 | Schmidt | July 4, 1933 |
| 2,376,190 | Roetheli et al. | May 15, 1945 |
| 2,443,210 | Upham | June 15, 1948 |
| 2,462,978 | Krchma et al. | Mar. 1, 1949 |
| 2,488,439 | Schaumann | Nov. 15, 1949 |
| 2,488,440 | Schaumann | Nov. 15, 1949 |
| 2,493,494 | Martin | Jan. 3, 1950 |
| 2,583,013 | Patterson | Jan. 22, 1952 |
| 2,607,440 | Lewis | Aug. 19, 1952 |